United States Patent [19]

George

[11] 4,217,989
[45] Aug. 19, 1980

[54] TAMPER-PROOF CLOSURE

[75] Inventor: Robert W. George, Naperville, Ill.

[73] Assignee: National Can Corporation, Chicago, Ill.

[21] Appl. No.: 965,430

[22] Filed: Dec. 1, 1978

Related U.S. Application Data

[62] Division of Ser. No. 832,176, Sep. 12, 1977.

[51] Int. Cl.² .............................................. B65D 41/32
[52] U.S. Cl. .................................. 215/253; 215/258; 215/252
[58] Field of Search ............... 215/252, 253, 254, 258; 220/266

[56] References Cited

U.S. PATENT DOCUMENTS

| | | | |
|---|---|---|---|
| 3,837,519 | 9/1974 | Perry | 215/252 |
| 3,861,551 | 1/1975 | Hannon | 215/252 |

Primary Examiner—George T. Hall
Attorney, Agent, or Firm—Robert A. Stenzel; Ralph R. Rath

[57] ABSTRACT

A new tamper-proof closure includes a cap having a plurality of circumferentially spaced slits separated by bridges with a plurality of lines of weakness extending perpendicular to the slits and aligned with the respective bridges. The lines of weakness have a residual thickness which varies between opposite ends.

8 Claims, 7 Drawing Figures

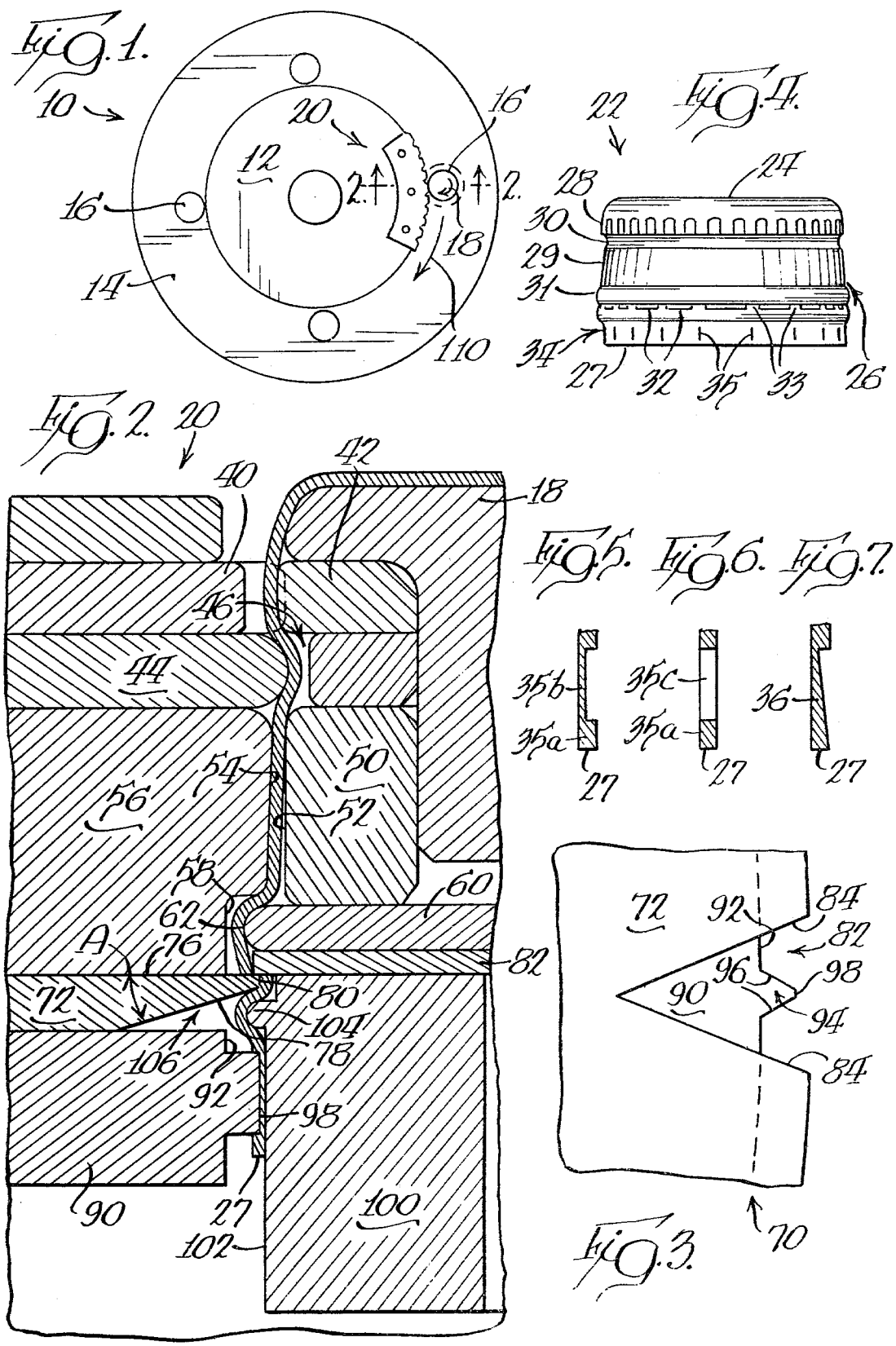

TAMPER-PROOF CLOSURE

This application is a division of United States application Ser. No. 832,176, filed Sept. 12, 1977.

BACKGROUND OF THE INVENTION

The present invention relates to metal closures which are threadedly received on the neck of a container and have a pilfer-proof skirt. The invention also relates to apparatus for forming such a closure.

The use of threaded closures to replace the conventional crown has become more and more popular in recent years, particularly in the carbonated beverage industry. The primary advantage of a threaded metal bottle closure is that the bottle can be resealed after it has initially been opened.

One type of threaded closure that has been used includes what is known as a pilfer-proof skirt which initially is formed as an integral part of the closure and which is separated from the closure when the closure is initially removed from the bottle. This type of pilfer-proof skirt is formed by producing circumferentially spaced slits around the peripheral lower edge of the closure and the slits are separated by small bridges which are ruptured when the closure is removed from the bottle leaving the pilfer-proof skirt on the bottle. Because of the recent public interest in recycling of containers, such a closure has serious drawbacks since the pilfer-proof section cannot readily be removed from the bottle for recycling purposes.

In order to avoid such objectionable permanently retained section on the bottle, a more recent development in pilfer-proof closures is disclosed in U.S. Pat. No. 3,601,273 wherein the closure again has circumferentially spaced horizontally extending slits around the peripheral lower edge thereof with vertically extending score lines in the lower portion of the closure that defines the pilfer-proof or tamper-proof section of the closure. In the closure illustrated in this patent, the vertical scores are ruptured when the closure is initially removed from the bottle. Because the vertical scores are randomly positioned on the pilfer-proof sections, some scores may be in alignment with the horizontal slits which may produce sharp pointed sections that project outwardly when the closure is initially removed from the bottle and results in a hazardous condition for anyone attempting to reuse the closure. This type of closure is formed by initially stamping a cap from a flat sheet with a press and producing internal vertical scores extending from the free end of the caps. The cap is transferred to a rolling machine which includes a stationary mandrel with a plurality of spindles that are moved around a circumferential path around the perimeter of the mandrel and are simultaneously rotated about their own axes. The spindles support the metal caps which are simultaneously knurled and the peripheral circumferentially spaces slits are formed therein. The closures are then placed on a bottle in another rolling operation which forms the threads in the closure wall and simultaneously deforms the free edge of the closure inwardly below a bead that is on the neck of the bottle.

Quite recently a new type of pilfer-proof closure has been developed, which is disclosed in Hannon, U.S. Pat. No. 3,861,551 and is similar in many respects to the previous closure discussed above. The unique feature of the closure shown in the Hannon patent is that the vertical scores on the pilfer-proof skirt are accurately positioned with respect to the bridging members between the circumferentially spaced horizontal slits to prevent the formation of sharp pointed sections which project outwardly from the skirt.

The closure of the Hannon patent also incorporates apparatus for producing the closures disclosed therein and the apparatus and method for forming such a closure are covered by U.S. Pat. No. 3,824,941. The apparatus disclosed in this patent consists of initially forming an upper knurled band on the cap, subsequently forming a lower outwardly extending bulge which may also be knurled to produce a second band and subsequently slitting the outwardly directed bulge and scoring the skirt portion below the bulge.

The apparatus for producing the slits and scores is theoretically capable of producing the closures disclosed in U.S. Pat. No. 3,861,551. However, actual practice has shown that the apparatus is not economically feasible for being used as production equipment. It has been found that the particular cutting mechanism proposed for producing the horizontal circumferentially spaced slits produces a tearing action at opposite ends of the respective slits which may result in sharp edges being developed during the formation of the slits. Also, the multicomponent arrangement for producing the vertical score is practically impossible to manufacture on a commercial scale because of the extremely close tolerances that must be maintained in producing such apparatus. Furthermore, the multicomponent arrangement requires repeated realignment to maintain the required tolerances. It will be appreciated that a closure of this type has a wall thickness on the order of 0.010 inches and the vertical scores must be accurately controlled to produce an acceptable closure that consistently has scores of uniform depth.

Another problem has been observed in using the Hannon type closure. During the rolling operation which attaches the closure to the bottle, it has been observed that the vertical scores are at least partially severed adjacent the free edge and the severed edges are overlapped which tends to indicate that the closure has been removed at least once. While the obvious solution to such problem would be to increase the thickness of the residual for the score, such solution is not acceptable because it would increase the force or turning torque required for removing the closure.

SUMMARY OF THE INVENTION

According to the present invention, a tamper-proof closure has a substantially flat top and a generally cylindrical skirt extending from the perimeter of the top with the skirt having a free edge. A plurality of circumferentially spaced lines of weakness extend from the free edge generally parallel to the axis of the skirt with each line of weakness having a thickness at the free edge which is greater than the thickness at the opposite end thereof.

In one embodiment of the invention, each line of weakness has a portion adjacent the free edge which is equal to the thickness of the skirt and the remainder has a constant thickness less than the thickness of the skirt. In another version, each line of weakness is formed by a slot spaced from the free edge of the skirt and in a further modification, each line of weakness has a constantly reducing thickness from the free edge to the opposite end.

BRIEF DESCRIPTION OF THE SEVERAL VIEWS OF THE DRAWINGS

FIG. 1 is a schematic illustration of a cap rolling machine having the present invention incorporated therein;

FIG. 2 is an enlarged fragmentary sectional view, as viewed along line 2—2 of FIG. 1;

FIG. 3 is an enlarged fragmentary plan view of the cutting and scoring tool constructed according to the present invention;

FIG. 4 is a side elevation view of the finished closure;

FIG. 5 is an enlarged fragmentary sectional view, as viewed along line 5—5 of FIG. 4;

FIG. 6 is a view similar to FIG. 5 showing a modified form of closure; and

FIG. 7 is a view similar to FIG. 5 showing a further modified form of closure.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings schematically illustrates a cap or closure forming machine, generally designated by the reference numeral 10. Forming machine 10 has a central stationary portion 12 and a circular portion 14 which is rotatable relative to the central portion 12. Rotatable portion 14 has a plurality of spindles 16 supported thereon and spindles 16 are adapted to be rotated about their own axes in the direction indicated by the arrow 18. The basic machine may be of the type that is presently available from Aluminum Company of America, Richmond Works, Richmond, Indiana, and identified as a PM-17 cap rolling machine.

According to one aspect of the present invention, cap rolling machine 10 incorporates a single station 20 for simultaneously deforming, knurling, slitting and scoring a cap to form a finished closure 22, as illustrated in FIG. 3. Closure 22 has a substantially flat top wall 24 and a peripheral cylindrical skirt 26 extending downwardly from the outer perimeter of the flat top wall 24 with cylindrical skirt 26 terminating in a lower free edge 27. Skirt or cylindrical side wall 26 has a knurled band 28 defined at the upper end thereof and a flat slightly tapered portion 29 below the knurled band 28 with an inwardly directed bead 30 at the upper end of tapered portion 29. Tapered portion 29 is capable of being deformed into a threaded section when bottle closure 22 is finally secured to the threaded neck of a bottle. An outwardly extending bulge 31 is located at the lower end of tapered portion 29 and bulge 31 may also be knurled, if desired. A plurality of circumferentially spaced slits 32 are formed in the outwardly extending bulge 31 intermediate upper and lower ends thereof; Slits 32, which extend perpendicular to the axis of skirt 26, are separated by bridges 33 and define a band 34 adjacent free edge 27. Band 34 has a plurality of lines of weakness 35 which extend perpendicular to the slits and parallel to the axis of closure 22 and the lines of weakness are equal in number to the bridges and are respectively aligned therewith, as more clearly illustrated in FIG. 4. The closure so far described is of the type illustrated in Hannon U.S. Pat. No. 3,861,551, portions of which are consistent herewith being incorporated herein by reference. As illustrated in FIG. 4 and disclosed in the Hannon patent, there are preferably eight bridges 33 around the perimeter of closure 22.

According to one aspect of the invention, the respective lines of weakness 35 are formed in a unique fashion to prevent severing of the lines of weakness while the closure is rolled onto the bottle. More specifically, each line of weakness has a residual thickness at free edge 27 which is greater than the residual thickness of the line of weakness at its opposite end adjacent slits 32.

As illustrated in FIG. 5, each line of weakness 35, includes a first portion 35a at free edge 27 which has a residual thickness equal to the thickness of side wall 26 and a second portion 35b which has a thickness substantially less than side wall 26. In addition, first portion 35a has a dimension axially of cylindrical side wall 26 which is greater than the thickness of side wall 26. The axial dimension is preferably in the range of about one to about three times the thickness of side wall 26.

While not limited to any specific dimensions, a specific example will be described. A closure 22 formed from aluminum having a side wall thickness of 0.009 inches and the axial dimension of scored portion 35a was 0.005 inches while the residual thickness of scored portion 35b was 0.002 inches.

It has been determined that leaving an unscored portion at the free edge of tamper-proof band 34 for each line of weakness 35 allows for greater latitude in the residual thickness of scored portion 35b. By proper selection of the axial dimension of unscored portion 35a, it is believed that the residual thickness may be as much as 0.005 inches and the closure can still be removed by applying a turning torque within required limits for such closures.

In fact, it is possible that scored portion 35b could be in the form of an axial slot 35c, as illustrated in FIG. 6, to produce each line of weakness. Alternatively, each line of weakness 35 could have a constantly reducing residual thickness 36 from free edge 27 to the opposite end thereof, as illustrated in FIG. 7. Of course, the residual thickness of scored portion 35b could also be of varying thickness from one end to the opposite end thereof.

Actual tests have shown that differentially scoring each line of weakness or having an unscored portion at the free edge of side wall 26 allows the closure to be rolled onto the neck of a bottle without having the lines of weakness fracture during such operation.

As indicated above, forming tool 20 incorporates mechanism for simultaneously deforming closure 22 to the configuration illustrated in FIG. 3 as well as producing the circumferentially spaced horizontally extending slits 34 connected by bridges 36 and vertical lines of weakness or scores 38.

For this purpose, tool 20 (FIG. 2) includes a knurling member 40 which cooperates with a circular inner member 42 rotated with spindle 16 adjacent the upper end thereof. Members 40 and 42 cooperate to produce the upper knurled band 28. Tool 20 also has a member 44 located directly below knurling member 40 and cooperating with a recess 46 on spindle 16 to produce an inwardly directed bead 30 located directly below knurled member 28. Spindle 16 has a cylindrical portion 50 supported thereon which has a slightly tapered outer surface 52 and cooperates with a corresponding tapered surface 54 on a cone forming member 56 that forms part of tool 20. The lower peripheral edge of member 56 has a recess portion 58 which cooperates with a circular disc 60 that has an arcuate peripheral surface 62 to produce the upper edge portion of outwardly directed bulge or bead 31. The apparatus so far described is identical to the apparatus incorporated into the existing PM-17 cap rolling machine discussed above.

According to the present invention, the forming, cutting and scoring tool 20 incorporates mechanism for simultaneously producing the circumferentially spaced horizontally extending slits as well as the vertically extending scores or lines of weakness 35 and accurately positioning the slits and lines of weakness with respect to each other. Tool 70 consists of an upper member 72 having a free edge 74 defining a cutting edge for producing slits 32. Cutting edge 74 is defined by an upper surface 76 that extends perpendicular to the axis of spindle 18 and a lower inclined flat surface 78 and the surfaces are interconnected at their outer ends by a small flat portion 80. Surfaces 76 and 78 cooperate with each other to define a small acute angle A which is preferably less than 45 degrees and in the specific illustrated embodiment is 30 degrees. The cutting edge 80 cooperates with a circular blade 82 which has a lower peripheral edge thereof in alignment with flat horizontal surface 76 to sever an intermediate portion of outwardly directed bulge or bead 31.

According to one aspect of the invention, the cutting edge 74 has a plurality of substantially V-shaped recesses 82 which are specifically configured to produce the interconnecting bridges 33 between respective slits 32. As most clearly illustrated in FIG. 4, the recesses 82 have opposed walls 84 that define an angle of substantially less than 90 degrees and in the specific embodiment illustrated, this angle is shown as being approximately 45 degrees. As schematically illustrated in FIG. 1, eight such recesses are produced at spaced locations along cutting edge 74 so that the finished closure will have eight slits 32 around the circumference of bead 31 with eight interconnecting bridges 33 all of exactly equal length. The advantage of forming the recesses 82 V-shaped in cross-section is that it has been determined that the V-shaped recess eliminates any tearing action at opposite ends of the respective slits.

Tool 70 also includes a second member 90 and second member 90 has an elongated peripheral surface 92 which is spaced from cutting edge 74 and extends across each of the recesses 82. Elongated surface 92 has a plurality of projections 94 extending therefrom and respectively located in each of the recesses 82 and being equally spaced from opposed walls 84 thereof. Each projection 94 extends parallel to the axis for spindle 18 and perpendicular to the cutting edge 74 of member 72 and has a free edge thereof spaced from cutting edge 74. More specifically, each elongated projection 94 is substantially V-shaped in cross-section and has opposed tapered walls 96 that define an angle of substantially less than 90 degrees and in the illustrated embodiment, the angle has been shown at being 60 degrees. The outer peripheral edge of each V-shaped projection 94 has a flat portion 98. Flat portion 80 on member 72 and flat portion 98 on member 90 preferably have a width of approximately 0.002 inches to thereby increase the service life of the cutting and scoring edges.

Members 72 and 90 cooperate with a specifically configured circular member 100 that is fixed on spindle 16 and has a circular or cylindrical outer surface 102 which has an arcuate bead 104 extending therefrom. Outwardly extending bead 104 is vertically aligned with a recess 106 defined between cutting member 72 and scoring member 90 to produce the lower edge portion of outwardly directed bulge 32.

The advantage of using a solid circular member 100 fixed to spindle 16 is that the spacing between the free edges 98 of each V-shaped scoring members 94 can be accurately controlled to thereby produce a score having a predetermined depth which is uniform for all closures.

As illustrated in FIG. 2, the lower end of each projection is located above lower edge or end 27 of side wall 26 to leave an unscored portion 35a for each line of weakness 35. Also, if the residual of portion 35b is designed to be of constantly reducing thickness free edge 98 would be inclined with respect to the cylindrical peripheral surface of member 100 and if the line of weakness is to have the configuration illustrated in FIG. 7, the lower end of free edge would be aligned with or below the lower end of side wall 26.

In operation, substantially cylindrical caps having a flat upper wall and a cylindrical skirt, which have a diameter substantially greater than the diameter of the respective members rotated with spindle 16, are respectively inserted upon the upper ends of spindles 16 and the spindles are moved along a circular path identified by the arrow 110 in FIG. 1. Simultaneously, the spindles are rotated about their own axes in the direction indicated by the arrow 18 in FIG. 1. Preferably, the speed of rotation of spindles 16 is coordinated so that the peripheral surfaces of the respective caps roll across the forming edges of tool 20. Thus, the blank cap is simultaneously deformed, slit and scored and all of the scores or slots and slits are accurately positioned with respect to each other to insure uniformity for each of the finished closures 22.

As can be appreciated from the above description, the present invention provides an extremely simple arrangement for producing horizontal slits and vertical lines of weakness adjacent the lower end of a closure and the lines of weakness are accurately angularly oriented with respect to the slits. The utilization of two integral members which respectively define all of the cutting edges and the scoring edges substantially reduces the cost of tooling and allows for accurate positioning and alignment of the respective members with respect to each other and with respect to a spindle cooperating therewith.

I claim:

1. A tamper-proof closure having a substantially flat top and a generally cylindrical skirt extending from the perimeter of said substantially flat top with said skirt having a free edge, a plurality of circumferentially spaced lines of weakness extending generally parallel to the axis of said skirt, each of said lines of weakness having a thickness at its end closest to said free edge which is greater than the thickness at an opposite end thereof.

2. A tamper-proof closure as defined in claim 1, in which each line of weakness has a portion adjacent said free end which is equal to the thickness of said cylindrical skirt and the remainder of each line of weakness has a constant thickness substantially less than the thickness of said cylindrical skirt.

3. A tamper-proof closure as defined in claim 2, in which said portion of each line of weakness has a dimension axially of said skirt which is greater than the thickness of said skirt.

4. A tamper-proof closure as defined in claim 1, in which each line of weakness has a constantly reducing thickness from said end to said opposite end.

5. A tamper-proof closure as defined in claim 1, in which each line of weakness includes a slot in said skirt free edge end.

6. A tamper-proof metal closure including a circular top wall and a generally cylindrical side wall extending from the periphery of said top wall and terminating in a free edge with a plurality of circumferentially spaced slits extending perpendicular to the axis of said side wall at a location to define a band, and a plurality of lines of weakness extending axially in said band, each of said lines of weakness having a maximum thickness at said free edge and a minimum thickness at the opposite end.

7. A closure as defined in claim 6, in which each of said lines of weakness has an unscored portion at said free edge.

8. A closure as defined in claim 7, in which the remainder of each of said lines of weakness has a substantially constant thickness which is substantially less than the thickness of said side wall.

* * * * *

UNITED STATES PATENT OFFICE
CERTIFICATE OF CORRECTION

PATENT NO. : 4,217,989
DATED : August 19, 1980
INVENTOR(S) : Robert W. George

It is certified that error appears in the above-identified patent and that said Letters Patent are hereby corrected as shown below:

In Column 2, line 6, change "closure" to -- disclosure --.

In Column 4, line 25, change "scored" to -- unscored --.

In Column 4, line 26, change "0.005" to -- 0.015 --.

In Column 7, line 6 (Claim 5), the words "free edge end" should read -- end --.

Signed and Sealed this

Thirtieth Day of June 1981

[SEAL]

Attest:

RENE D. TEGTMEYER

Attesting Officer     Acting Commissioner of Patents and Trademarks